US009878671B2

(12) United States Patent
Murray et al.

(10) Patent No.: US 9,878,671 B2
(45) Date of Patent: Jan. 30, 2018

(54) MOTOR VEHICLE HAVING A STOWABLE STORAGE APPARATUS

(71) Applicant: FORD GLOBAL TECHNOLOGIES, LLC, Dearborn, MI (US)

(72) Inventors: Andrew John Murray, Colchester (GB); Bruce Southey, Farnham (GB); Niall Hamilton, Tetbury (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/196,772

(22) Filed: Jun. 29, 2016

(65) Prior Publication Data
US 2017/0001570 A1    Jan. 5, 2017

(30) Foreign Application Priority Data

Jul. 1, 2015 (GB) .................................. 1511511.6

(51) Int. Cl.
B60R 11/06 (2006.01)
B60R 7/04 (2006.01)
B60R 7/06 (2006.01)
B60R 11/00 (2006.01)

(52) U.S. Cl.
CPC ............. B60R 7/04 (2013.01); B60R 7/06 (2013.01); B60R 2011/0082 (2013.01); B60R 2011/0084 (2013.01)

(58) Field of Classification Search
CPC .... B60N 2/3011; B60N 2/3075; B60N 2/305; B60N 2/309; B60N 2/3065; B60N 2/002; B60N 2/206; B60N 2/2833; B60N 2/2863; B60N 2/2869
USPC ..................... 296/37.8, 37.14, 37.5
See application file for complete search history.

(56) References Cited

U.S. PATENT DOCUMENTS

| | | | | |
|---|---|---|---|---|
| 4,223,939 A | * | 9/1980 | Beggs | B60P 3/341 296/26.11 |
| 4,355,837 A | * | 10/1982 | Shimizu | B60R 7/06 296/37.12 |
| 5,716,091 A | * | 2/1998 | Wieczorek | B60R 5/04 224/275 |
| 5,845,954 A | * | 12/1998 | DePue | B60R 7/06 16/82 |
| 6,106,043 A | * | 8/2000 | Izumo | B60R 7/06 296/37.12 |

(Continued)

FOREIGN PATENT DOCUMENTS

| | | |
|---|---|---|
| JP | 2012020669 A | 2/2012 |
| WO | 2012168652 A1 | 12/2012 |

OTHER PUBLICATIONS

English Machine Translation of JP2012020669A.
English Machine Translation of WO2012168652A1.

Primary Examiner — Kiran B Patel
(74) Attorney, Agent, or Firm — Vichit Chea; King & Schickli, PLLC

(57) ABSTRACT

A motor vehicle having a stowable storage apparatus is disclosed having a large deployed-to-stowed volume ratio thereby providing a useful carry capacity while being easy to package. The stowable storage apparatus includes a rigid first end wall and two flexible vertically disposed spaced apart side walls. The first end wall and the two side walls define, when the stowable storage apparatus is in a deployed state, three sides of an enclosure for storing one or more small objects.

18 Claims, 9 Drawing Sheets

(56) References Cited

U.S. PATENT DOCUMENTS

| | | | |
|---|---|---|---|
| 6,231,099 B1* | 5/2001 | Greenwald | B60R 7/06 220/531 |
| 6,682,115 B1* | 1/2004 | Tiesler | B60R 7/005 224/483 |
| 6,715,815 B2* | 4/2004 | Toppani | B60R 7/06 296/37.12 |
| 6,921,118 B2* | 7/2005 | Clark | B60N 2/4686 296/24.34 |
| 7,140,660 B2* | 11/2006 | Oana | B60N 3/102 224/926 |
| 7,201,421 B2* | 4/2007 | Reynolds | B60R 7/02 224/400 |
| 7,658,431 B2* | 2/2010 | Foussianes | B60N 2/002 296/68.1 |
| 7,770,952 B2* | 8/2010 | Hanzel | B60N 3/08 296/24.34 |
| 7,921,998 B2* | 4/2011 | Schenker | B42F 15/00 206/425 |
| 8,517,444 B2* | 8/2013 | D'Alessandro | B60R 7/04 296/24.43 |
| 8,714,093 B2* | 5/2014 | Rigner | B60N 3/002 108/45 |
| 8,939,491 B2* | 1/2015 | Gillis | B60R 7/04 296/24.34 |
| 9,216,692 B2* | 12/2015 | Brinster | B60R 7/005 |
| 9,238,439 B2* | 1/2016 | Huebner | B60R 7/04 |
| 9,257,799 B2* | 2/2016 | Stubbs | H01R 13/73 |
| 9,381,871 B2* | 7/2016 | Murray | B60R 5/04 |
| 2003/0116461 A1* | 6/2003 | Colloton | B65D 5/64 206/425 |
| 2006/0022479 A1* | 2/2006 | Mulvihill | B60R 7/02 296/37.16 |
| 2008/0029986 A1 | 2/2008 | Watanabe et al. | |
| 2008/0079279 A1* | 4/2008 | Spykerman | B60R 7/04 296/24.34 |
| 2009/0000975 A1* | 1/2009 | Schenker | B65D 25/06 206/425 |
| 2009/0001748 A1* | 1/2009 | Brown | B60R 7/005 296/37.8 |
| 2010/0090491 A1 | 4/2010 | Hipshier et al. | |
| 2013/0249232 A1 | 9/2013 | Dinger et al. | |
| 2013/0320694 A1 | 12/2013 | Dinger et al. | |
| 2014/0367396 A1 | 12/2014 | Schmalz et al. | |

* cited by examiner

MOTOR VEHICLE HAVING A STOWABLE STORAGE APPARATUS

TECHNICAL FIELD

This document relates to the provision of an apparatus in a cabin of a motor vehicle for temporarily storing small objects during transit and, in particular, to a stowable storage apparatus having a large deployed-to-stowed volume ratio for mounting in the cabin of a motor vehicle.

BACKGROUND

Some motor vehicles have an interior architecture often described as being of a 'walkthrough' design. This is when a floor console between a first row of seats does not connect with an instrument panel of the motor vehicle but stops short of the instrument panel or when the motor vehicle has a bench type seat. The gap between the instrument panel and the floor console or the bench seat will be referred to here as the 'walkthrough gap'.

The presence of a 'walkthrough gap' can improve the feeling of space for those who want to have less of a 'cockpit' feel. However, some storage space is lost with such an arrangement when the floor console does not extend from between the front seats to the instrument panel as this part of the floor console is often provided with some storage capacity.

The use of a long floor console extending to the instrument panel is popular because a gear selector and sometimes a parking brake lever or switch can be housed in this part of the floor console. The inventors have realised that, as vehicles increasingly move to electric parking brakes, drive-by wire including electronically controlled gearboxes and electric or hybrid powertrains, items such as a parking brake lever or switch and a gear selector can be housed elsewhere in the passenger compartment of the motor vehicle thereby facilitating the use of a shorter floor console providing a 'walkthrough gap'.

However, it is disadvantageous when the floor console is short and ends at a position level with the front seats due to the loss of storage space in a central location within the motor vehicle.

It is an object to provide a stowable storage apparatus that solves the problem of lost storage space thereby facilitating the provision of a walkthrough arrangement.

It is a second object to provide a stowable storage apparatus that has a large deployed-to-stowed volume ratio.

According to a first aspect, there is provided a motor vehicle having a cabin, a row of seats mounted in the cabin, a structural component mounted in the cabin and a stowable storage apparatus comprising a rigid first end wall and two flexible vertically disposed spaced apart side walls. Each of the flexible side walls have first and second ends and are fastened at their first ends to the first end wall such that, when the first end wall is in a deployed position, the first end wall and the two side walls define three sides of an enclosure for storing one or more small objects supported by the structural component. A central walkthrough gap is defined between the structural member and the row of seats. When the stowable storage apparatus is in the deployed state, the first end wall of the stowable storage apparatus is spaced away from the structural component so that the flexible side walls of the stowable storage apparatus span substantially the entire longitudinal depth of the central walkthrough gap.

Each flexible side wall may be attached at a second end to a respective spring biased roller. The spring biasing of the roller is arranged to promote rolling of the flexible material from which the respective flexible side wall is made onto the roller.

The flexible side walls may be rolled onto their respective rollers when the first end wall is in a stowed position.

When the first end wall is moved away from the stowed position to the deployed position, the two flexible side walls may be unrolled from their respective rollers against the action of the spring biasing of the rollers.

When the first end wall is in the deployed position the biasing spring may produce a tension in both of the flexible side walls thereby holding them taut.

Alternatively the apparatus may further comprise a floor joining together the two flexible side walls and the two flexible side walls and the floor of the apparatus form a collapsible corrugated U-shaped trough.

When the first end wall is moved from the deployed position to a stowed position, the two flexible side walls and the floor may fold in a concertina manner.

The collapsible corrugated U-shaped trough may be formed from a number of wire stays connected together by fabric.

The apparatus may further comprise a pair of spaced apart extendible rails and the collapsible corrugated U-shaped trough may be suspended from the pair of spaced apart extendible rails.

The stays in one of the two side walls may have upper ends slideably attached to a first one of the pair of extendible rails and the stays in the other of the two side walls may have upper ends slideably attached to a second one of the pair of extendible rails.

When the stowable storage apparatus is in a stowed state, the first end wall of the stowable storage apparatus may be positioned adjacent the structural component so that the stowable storage apparatus reduces by only a small amount the longitudinal depth of the central walkthrough gap.

The structural component may be an instrument panel of the motor vehicle and the stowable storage apparatus may be supported by a central column of the instrument panel.

When the stowable storage apparatus is in the stowed state, the first end wall may abut against a face of the central column of the instrument panel.

The face may include a depression and, when the stowable storage apparatus is in the stowed state, the depression may form a small opening between the first side wall of the stowable storage apparatus and the central column for stowing small flat objects.

The row of seats may comprise a pair of spaced apart front seats with a floor console mounted therebetween and the central walkthrough gap may be defined between a front end of the floor console and the central column of structural component.

The floor console may include a latch for holding the stowable storage apparatus in the deployed state.

The central column may include a panel defining a second end wall for the stowable storage apparatus.

The panel, the first end wall and the two side walls may form a four sided enclosure for storing one or more small objects.

BRIEF DESCRIPTION OF THE DRAWING FIGURES

The stowable storage apparatus will now be described by way of example with reference to the accompanying drawing of which:

DETAILED DESCRIPTION

Figure 1:
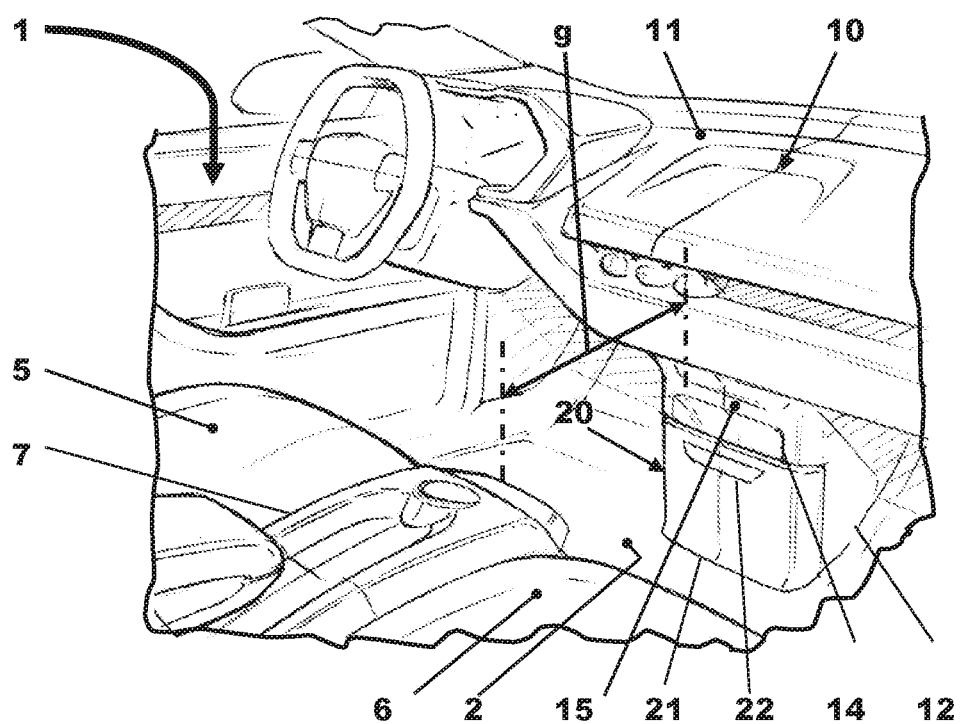
FIG. 1 is a pictorial view of part of a cabin of a motor vehicle showing a first embodiment of stowable storage apparatus in a stowed state.
Figure 2:
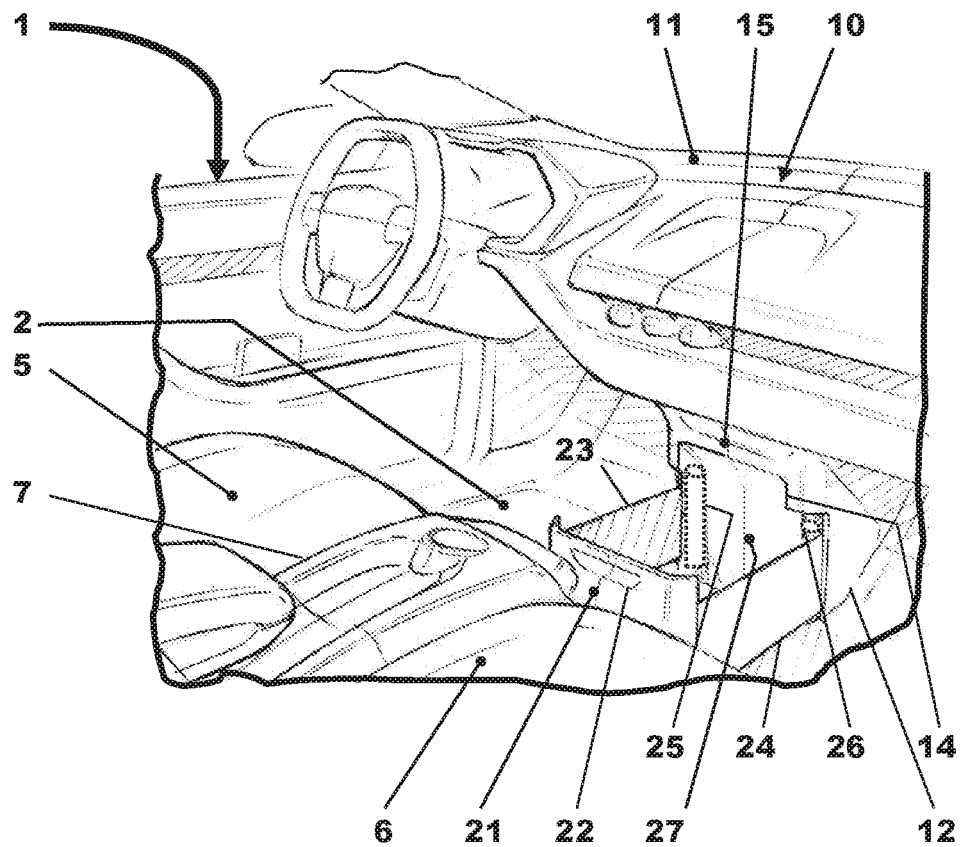
FIG. 2 is a pictorial view similar to FIG. 1 but showing the stowable storage apparatus in a deployed state.

With particular reference to FIGS. 1 and 2 there is shown a cabin 1 of a motor vehicle in which is mounted a structural member in the form of an instrument panel 10, a pair of front seats 5, 6, a floor console 7 mounted between the two seats 5, 6 and a stowable storage apparatus 20.

The instrument panel 10 has a transversely extending elongate upper part 11 and a central column 12 extending between a lower end of the elongate upper part 11 and a floor 2 of the motor vehicle.

A walkthrough gap 'g' is defined between a front end of the floor console 7 and a rear facing panel 15 of the central column 12.

The stowable storage apparatus 20 comprises a rigid first end wall 21 and two flexible vertically disposed spaced apart side walls 23, 24 which in combination define, when the stowable storage apparatus is in a deployed state as illustrated in FIG. 2, three sides of an enclosure for storing one or more small objects.

Each of the flexible side walls 23, 24 has a first end fastened to the first end wall 21. A second end of each flexible side wall 23, 24 is attached to a respective spring biased roller 25, 26 (shown in dotted outline). The spring biasing of the rollers 25, 26 is arranged to promote rolling of flexible material from which the flexible side walls 23, 24 are made onto the respective roller 25, 26. The rollers 25, 26 are mounted in the case of this embodiment behind a panel 27 of the central column 12 of the instrument panel 10 that forms a second end wall for the stowable storage apparatus 20. The panel 27 defines apertures or slits through which the flexible material extends for attachment to the first end wall 21. Each of the rollers 25, 26 is rotatable about a substantially vertical axis of rotation and is held in place by a part of the structure forming the central column 12.

A handle 22 is located on an outer face of the first end wall 21 for use by a user of the stowable storage apparatus.

A recess or depression 14 is formed in the rear facing panel 15 of the central column 12. The depression 14 forms a small opening between the first side wall 21 of the stowable storage apparatus 20 and the central column 12 for stowing a small flat object such as a newspaper, magazine or map even when the stowable storage apparatus 20 is in the stowed state shown in FIG. 1.

In the stowed state, the first end wall 21 is positioned adjacent to and abuts against the rear facing panel 15 of the central column 12 and the flexible side walls 23, 24 are rolled onto their respective rollers 25, 26.

Therefore, in the stowed state the volume occupied by the stowable storage apparatus 20 with the cabin 1 and in particular within the central column 12 is very small. Also, because the first end wall 21 is positioned adjacent the rear facing panel 15 of the central column 12 in the stowed state and is relatively thin, the stowable storage apparatus 20 reduces by only a small amount the longitudinal depth of the central walkthrough gap 'g' when the stowable storage apparatus 20 is stowed.

However, when the stowable storage apparatus 20 is configured, as shown in FIG. 2, in a deployed state, the first end wall 21 of the stowable storage apparatus 20 is spaced away from the central column 12 and is latched to an end of the floor console 7 by a latching means (not shown) that engages with a latch component (not shown).

Therefore, in the deployed state, the flexible side walls 23, 24 of the stowable storage apparatus 20 span substantially the entire longitudinal depth of the central walkthrough gap 'g'. In the deployed position the two flexible side walls 23, 24 are unrolled from their respective rollers 25, 26 against the action of the biasing spring of the rollers 25, 26 and the action of the biasing spring produces a tension in both of the flexible side walls 23, 24 thereby holding them taut.

It will be appreciated that, in order to produce further tension in the side walls 23, 24 when the stowable storage apparatus 20 is in the deployed state, the length of material used for the side walls 23, 24 is tailored to suit the application such that minimal additional extension of the side walls 23, 24 is possible when the stowable storage apparatus 20 is in the deployed state.

It will be appreciated that, when the stowable storage apparatus 20 is in the deployed state, the panel 27, the first end wall 21 and the two side walls 23, 24 form a four sided enclosure for transporting or temporary stowage of small objects such as, for example and without limitation, a take-away meal, a packet of biscuits, a tablet computer, a bottle of wine, a purse, a wallet, a handbag and other like small objects.

When the stowable storage apparatus 20 is in the deployed state, it occupies a large volume in the cabin compared to the volume it occupies when it is stowed. Therefore, a significant carrying volume is provided by the stowable storage apparatus in the deployed state.

The deployed-to-stowed volume ratio of such a stowable storage apparatus 20 is therefore very high which is advantageous because such an apparatus is easy to package while providing a significant storage capacity.

Figure 3:
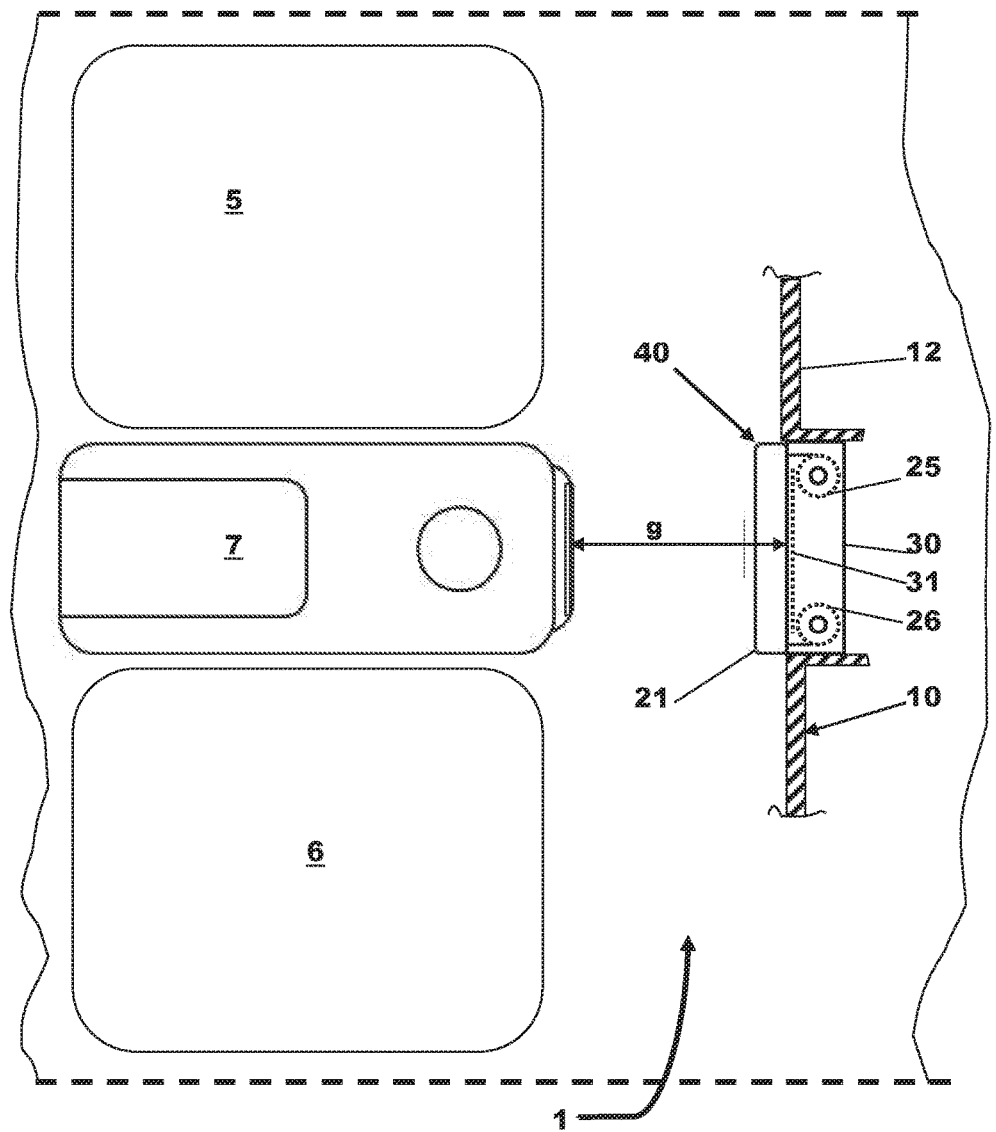
FIG. 3 is a schematic plan view of the part of the cabin of the motor vehicle shown in FIGS. 1 and 2 but showing a second embodiment of a stowable storage apparatus in a stowed state.
Figure 4:
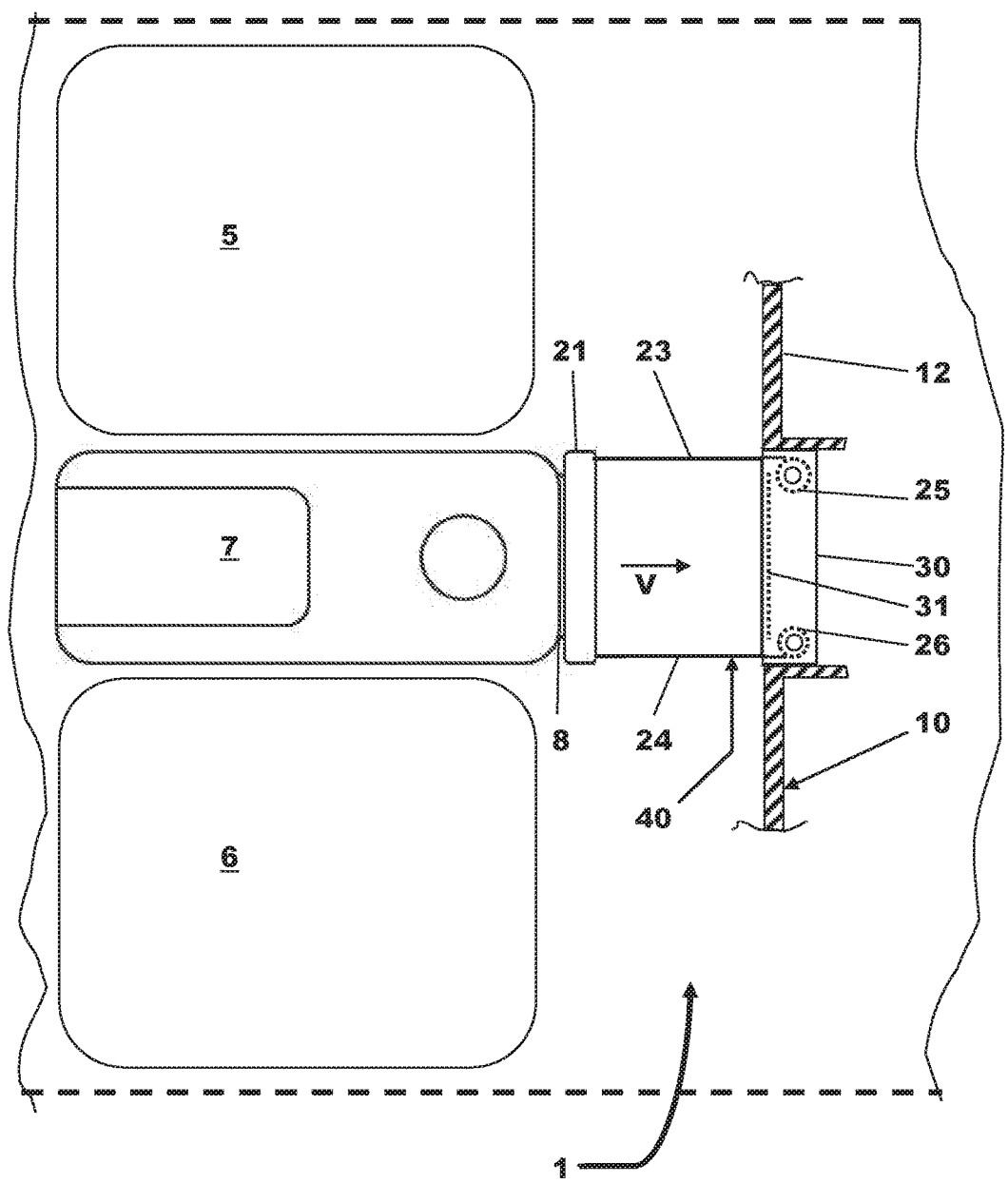
FIG. 4 is a schematic plan view of the part of the cabin of the motor vehicle shown in FIGS. 1 and 2 but showing the stowable storage apparatus in a deployed state.

FIGS. 3 and 4 both show a stowable storage apparatus that is in most respects the same as that previously described and for which identical parts have the same reference numerals applied to them. The main difference between this second embodiment and that previously described is that the stowable storage apparatus does not rely on the use of components of the instrument panel 10 to support the rollers but is formed as a self-contained cassette assembly 40 that can be fitted into an aperture in any suitable structural component of the motor vehicle.

In the case of this example the structural component is the central column 12 of the instrument panel 10 but it will be appreciated that the cassette assembly 40 could also be fitted into an aperture in a rear end of a floor console to provide storage for a second row of seats or in a front end of a shortened floor console to provide a similar utility to that provided by the apparatus shown in FIGS. 1 and 2.

The cassette assembly 40 comprises a housing 30 that supports two rollers 25, 26. As before, two flexible side walls 23, 24 are fastened at one end to the first end wall 21 and at an opposite end to the two rollers 25, 26.

A wall 31 of the housing 30 forms a second end wall for the stowable storage apparatus. The wall 31 defines two slots through which the flexible side walls 23, 24 extend between the first end wall 21 and the two rollers 25, 26.

Operation and utility of this embodiment is the same as that previously described with respect to FIGS. 1 and 2 and will not therefore be described again in detail. As before, the first end wall 21 is displaced from a stowed position to a deployed position against the action of spring biasing means associated with the two rollers 25, 26. As before the first end wall 21 is positioned close to a front end of the floor console 7 when the stowable storage apparatus is in the deployed state.

The apparatus shown in FIGS. 1 to 4 relies on the flexible side walls 23, 24 being positioned in the deployed state close to the floor 2 of the motor vehicle there being no floor for the stowable storage apparatus 20.

With such an arrangement very small objects such as, for example, pens, pencils or loose change could slip under the extended flexible side walls 23, 24 when the stowable storage apparatus 20 is in the deployed state. Therefore, to minimise this risk, the flexible side walls 23, 24 can be arranged to extend within a recess bounded by walls.

Figure 5:
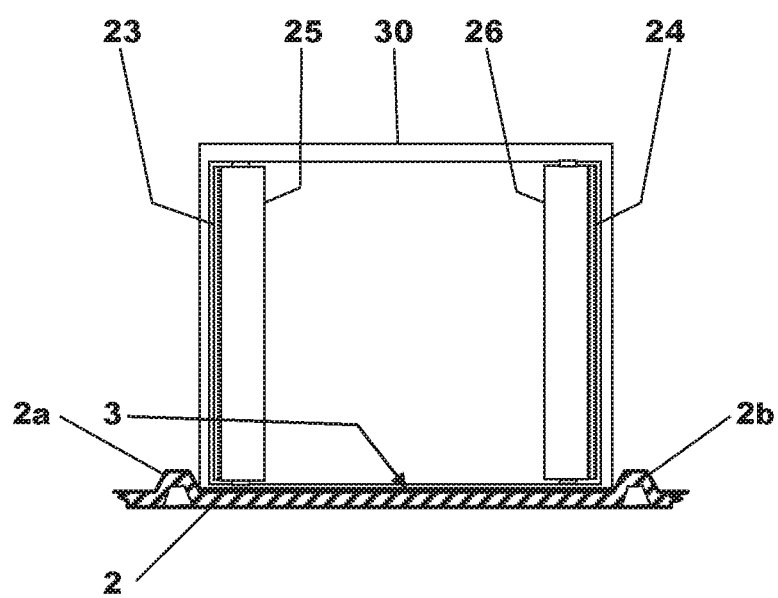
FIG. 5 is a view in the direction of the arrow V on FIG. 4 showing how a floor of the motor vehicle cabin defines a recess for accommodating side walls of the stowable storage apparatus.

FIG. 5 which is a view in the direction of arrow V on FIG. 4 (with the wall 31 omitted) shows one such arrangement in which the floor 2 has been deformed to produce a pair of upstanding walls 2a, 2b defining therebetween a recess 3 into which the flexible walls 23, 24 extend when the stowable storage apparatus 20 is deployed. With such an arrangement it is more difficult for small objects to pass under the flexible side walls 23, 24.

With reference to FIGS. 6 to 9 there is shown a third embodiment of a stowable storage apparatus 120 for use in a cabin 1 of a motor vehicle.

As before a structural member in the form of an instrument panel 10, a pair of front seats 5, 6, a floor console 7 mounted between the two seats 5, 6 and the stowable storage apparatus 120 are all mounted in the cabin 1.

As before, the instrument panel 10 has a transversely extending elongate upper part 11 and a central column 12 extending between a lower end of the elongate upper part 11 and a floor 2 of the motor vehicle. A walkthrough gap 'G' is defined between a front end of the floor console 7 and a part of the stowable storage apparatus 120 that overlies the central column 12.

The stowable storage apparatus 120 comprises a rigid first end wall 121 and two flexible vertically disposed spaced apart side walls 123, 124 which in combination define, when the stowable storage apparatus 120 is in a deployed state, three sides of an enclosure for storing one or more small objects.

Each of the flexible side walls 123, 124 has a first end fastened to the first end wall 121. A second end of each flexible side wall 123, 124 is attached to a panel 116 of the central column 12.

A floor 125 (FIG. 9) joins together the two flexible side walls 123, 124 and the two flexible side walls 123, 124 and the floor 125 form a collapsible corrugated U-shaped trough.

The side walls 123, 124 and floor 125 forming the collapsible corrugated U-shaped trough are made from a number of bent wire stays 130 connected together by fabric.

A pair of spaced apart extendible rails 126, 128; 127, 129 are used to suspend the collapsible corrugated U-shaped trough. Each of the extendible rails has a first part 126, 127 connected to the first end wall 121 and a second part 128, 129 fastened to part of the central column 12.

Upper ends of the bent stays 130 in a first one 123 of the two side walls 123, 124 are slideably attached to a first one 126, 128 of the pair of extendible rails 126, 128, 127; 129 and upper ends of the bent stays 130 in the other one 124 of the two side walls 123, 124 are slideably attached to a second one 127, 129 of the pair of extendible rails 126, 128; 127, 129.

Due to the corrugated nature of the U-shaped trough, when the first end wall 121 is moved from the deployed position to a stowed position, the two flexible side walls 123, 124 and the floor 125 fold up in a concertina manner.

Figure 6:
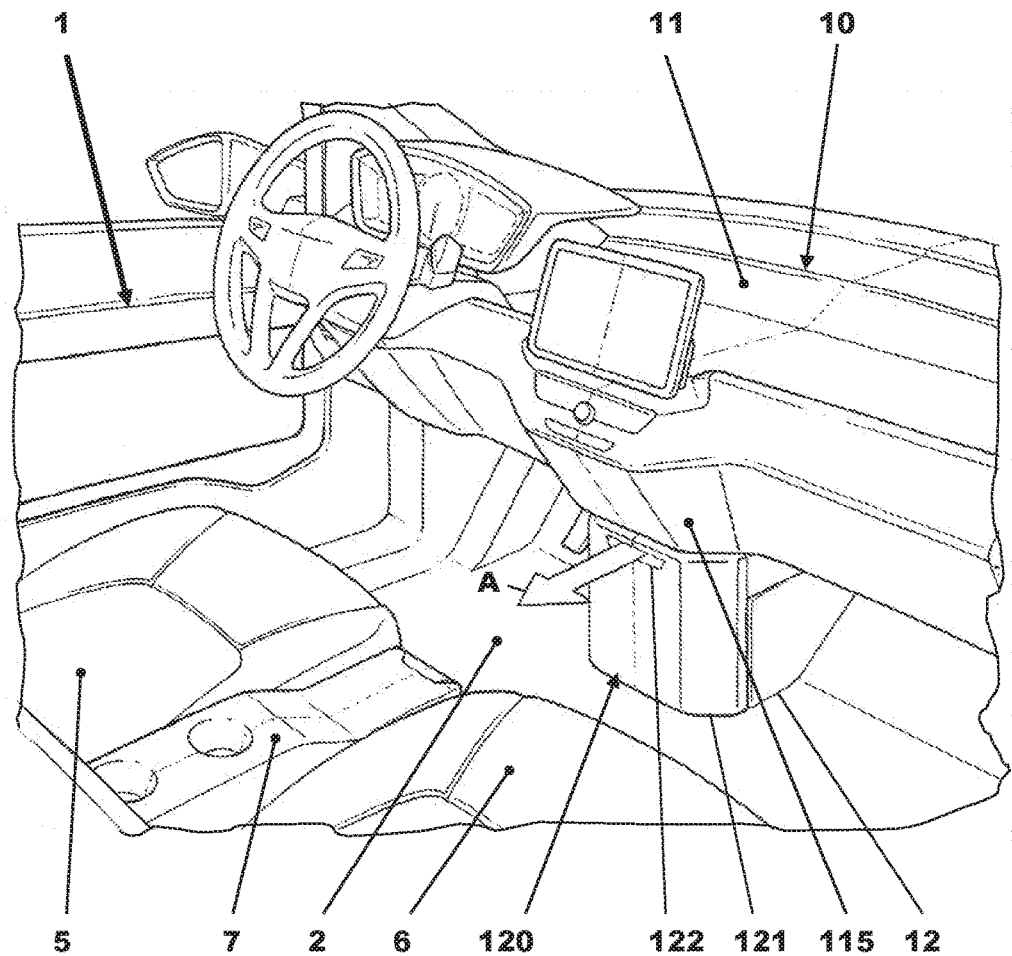
FIG. 6 is a pictorial view of part of a cabin of a motor vehicle showing a third embodiment of stowable storage apparatus in a stowed state.

In the stowed state shown in FIG. 6, the first end wall 121 is positioned adjacent to the rear facing panel 115 of the central column 12 so as to form a substantially continuous surface. Therefore, in the stowed state the volume occupied by the stowable storage apparatus 120 is very small. Also, because the first end wall 121 is positioned adjacent the rear facing panel 115 of the central column 12, the stowable storage apparatus 120 reduces minimally the longitudinal depth of the central walkthrough gap 'G' between the panel 116 and the front of the floor console 7.

To change the configuration of the stowable storage apparatus 120 from the stowed state shown in FIG. 6 a handle 122 is used to pull and unlatch the first end wall 121 in the direction of the arrow 'A' shown on FIG. 6.

Figure 8:
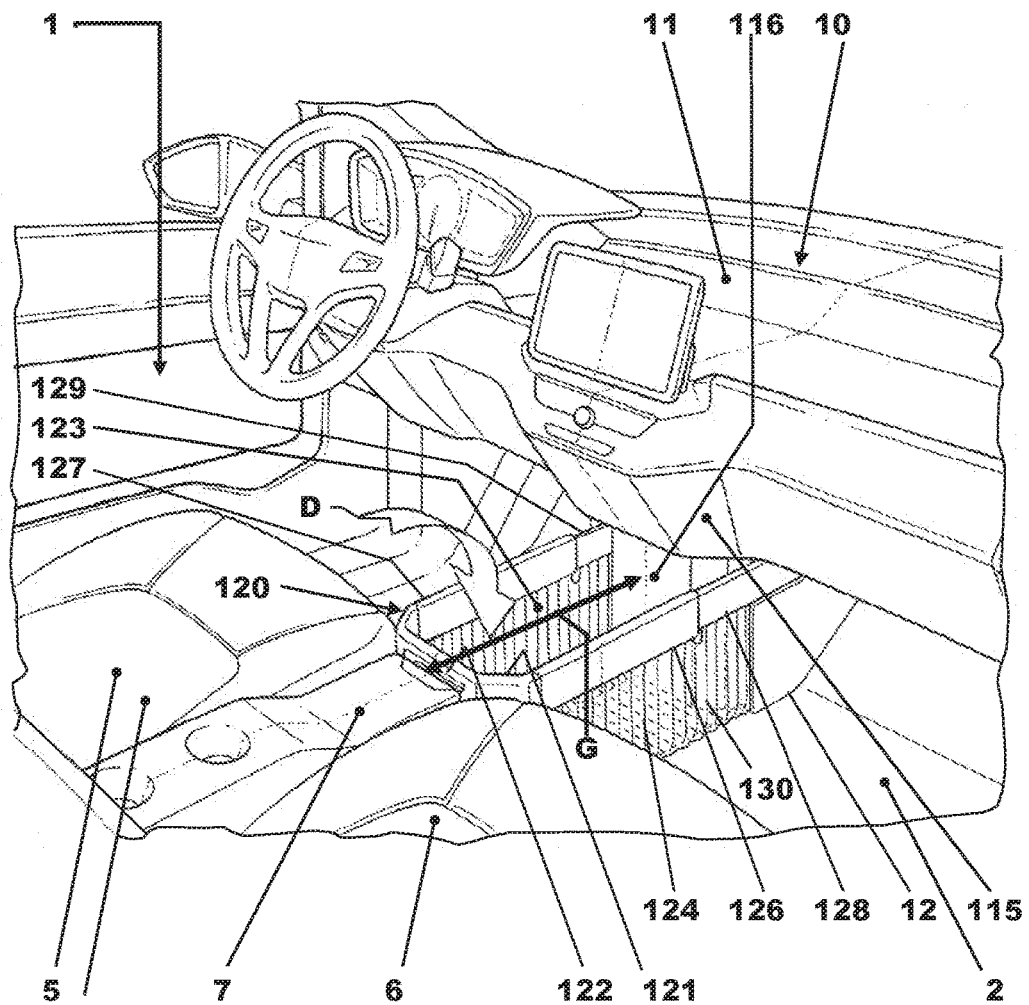
FIG. 8 is a view similar to FIG. 6 but showing the stowable storage apparatus in a fully deployed state.
Figure 9:
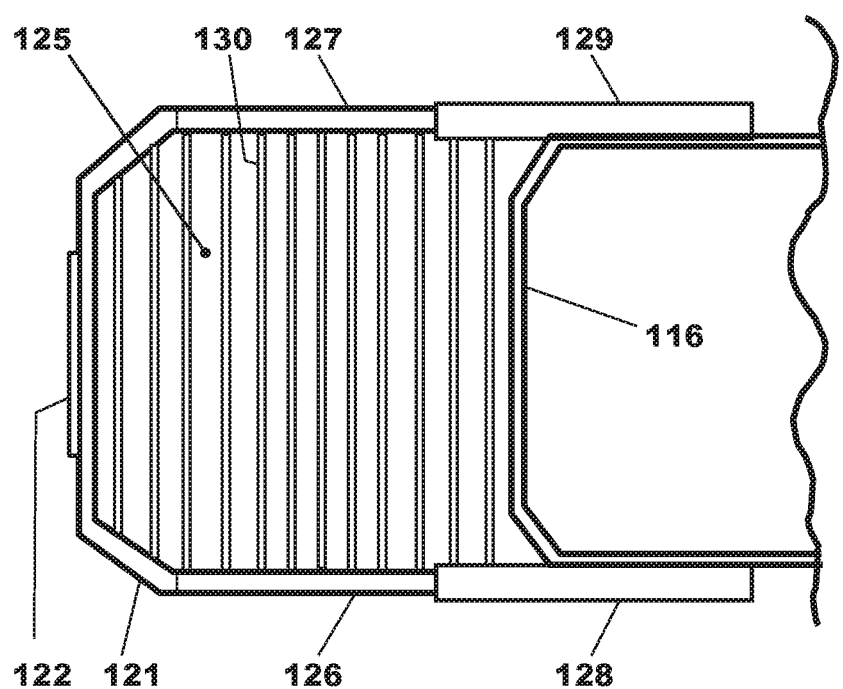
FIG. 9 is a plan view in the direction of the arrow 'D' on FIG. 8.

When the stowable storage apparatus 120 is configured, as shown in FIGS. 8 and 9, in a fully deployed state, the first end wall 121 of the stowable storage apparatus 120 is spaced away from the central column 12 and is latched to an end of the floor console 7 by a latching means (not shown) that, in this case, engages with a complementary latch (not shown) on the first end wall 121.

Therefore, in the deployed state, the flexible side walls 123, 124 of the stowable storage apparatus 120 span substantially the entire longitudinal depth of the central walkthrough gap 'G'.

It will be appreciated that, in order to produce tension in the side walls 123, 124 and the floor 125 when the stowable storage apparatus 120 is in the deployed state, the amount of material used for the side walls 123, 124 and the floor 125 is tailored to suit the application such that minimal additional extension of the side walls 123, 124 and the floor 125 is possible when the stowable storage apparatus 20 is in the deployed state. That is to say, in the deployed state, the side walls 123, 124 and the floor 125 are held taut.

It will be appreciated that, when the stowable storage apparatus 120 is in the deployed state, the panel 116, the first end wall 121, the floor 125 and the two side walls 123, 124 form a four sided enclosure for transporting or temporary stowage of small objects such as those previously referred to. As before, when the stowable storage apparatus 120 is in the deployed state, it occupies a large volume compared to the volume it occupies when it is stowed. The deployed-to-stowed volume ratio of this stowable storage apparatus is therefore also advantageously high thereby providing a good ratio of carrying capacity to required packaging volume.

Figure 7:
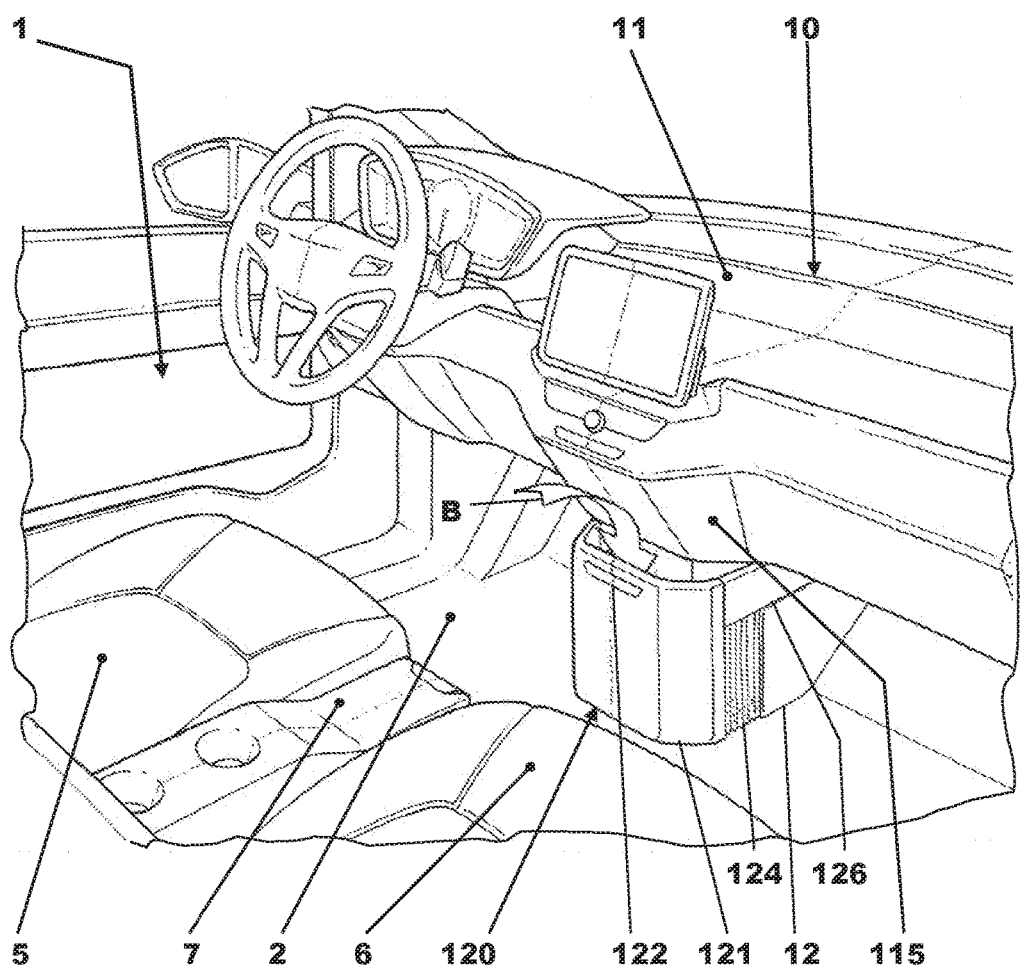
FIG. 7 is a view similar to FIG. 6 but showing the stowable storage apparatus in a partially deployed state.

In FIG. 7 the stowable storage apparatus 120 is shown in a partially deployed state in which the first end wall has been displaced away from the central console 12 a short distance so that small flat articles such as a newspaper, a magazine or a map can be temporarily stored by inserting them into the gap between the first end wall 121 and the rear facing panel 115 as indicated by the arrow 'B' on FIG. 7.

It will be appreciated that with this third embodiment a number of further partially deployed positions could be provided by means of detents on the first and second parts 126 and 128; 127 and 129 of the pair of extendible telescoping rails 126, 128; 127, 129.

The stowable storage apparatus 20, 120:
Allows a 'walkthrough' architecture to be maintained by virtue of being deployable and not a permanent feature;
Keeps a range of items secure and close to hand while driving;
Keeps items off the floor or out of a footwell so they stay clean and dry;
Avoids common issues with storing items on the seat such as falling off under braking or needing them to be cleared for passengers;
Can be used with or without a passenger present; and
Can be stowed away when not required.

Because of the collapsible nature of such a stowable storage apparatus 20, 120, it provides much more space for storage than is required for it to be stowed particularly when compared to a drawer. It will however be appreciated that, unlike a drawer, such an apparatus cannot be stowed when full of items.

It will be appreciated by those skilled in the art that although the stowable storage apparatus 20, 120 has been described by way of example with reference to one or more embodiments it is not limited to the disclosed embodiments and that alternative embodiments could be constructed without departing from the scope of the apparatus as defined by the appended claims.

What is claimed:

1. A motor vehicle having a cabin, a row of seats mounted in the cabin, a structural component mounted in the cabin and a stowable storage apparatus comprising a first end wall and two side walls, wherein each of the two side walls (a) has a first end and a second end and (b) are fastened at their first ends to the first end wall whereby, when the first end wall is in a deployed position, the first end wall and the two side walls define three sides of an enclosure for storing one or more small objects supported by the structural component wherein a central walkthrough gap is defined between the structural component and the row of seats and, when the stowable storage apparatus is in a deployed state, the first end wall of the stowable storage apparatus is spaced away from the structural component so that the two side walls of the stowable storage apparatus span substantially an entire longitudinal depth of the central walkthrough gap.

2. A vehicle as claimed in claim 1 wherein each of the two side walls is attached at the second end to a respective spring biased roller, a biasing spring of the roller being arranged to promote rolling of flexible material from which each of the side walls is made onto the roller.

3. A vehicle as claimed in claim 2 wherein the two side walls are rolled onto their respective rollers when the first end wall is in a stowed position.

4. A vehicle as claimed in claim 3 wherein, when the first end wall is moved away from the stowed position to the deployed position the two side walls are unrolled from their respective rollers against an action of the biasing spring of the rollers.

5. A vehicle as claimed in claim 4 wherein when the first end wall is in the deployed position the biasing spring produces a tension in both of the two side walls thereby holding the two side walls taut.

6. A vehicle as claimed in claim 1 wherein the apparatus further comprises a floor joining together the two side walls and the two side walls and the floor of the apparatus form a collapsible corrugated U-shaped trough.

7. A vehicle as claimed in claim 6 wherein, when the first end wall is moved from the deployed position to the stowed position, the two side walls and the floor fold in a concertina manner.

8. A vehicle as claimed in claim 6 wherein the collapsible corrugated U-shaped trough is formed from a number of wire stays connected together by fabric.

9. A vehicle as claimed in claim 8 wherein the apparatus further comprises a pair of extendible rails and the collapsible corrugated U-shaped trough is suspended from the pair of extendible rails.

10. A vehicle as claimed in claim 9 wherein the number of wire stays in one of the two side walls have upper ends slideably attached to a first one of the pair of extendible rails and the number of wire stays in the other of the two side walls have upper ends slideably attached to a second one of the pair of extendible rails.

11. A vehicle as claimed in claim 1 wherein when the stowable storage apparatus is in a stowed state, the first end wall of the stowable storage apparatus is positioned adjacent the structural component so that the stowable storage apparatus reduces by only a small amount the longitudinal depth of the central walkthrough gap.

12. A vehicle as claimed in claim 11 wherein the structural component is an instrument panel of the motor vehicle and the stowable storage apparatus is supported by a central column of the instrument panel.

13. A vehicle as claimed in claim 12 wherein, when the stowable storage apparatus is in the stowed state, the first end wall abuts against a face of the central column of the instrument panel.

14. A vehicle as claimed in claim 13 wherein the face includes a depression and, when the stowable storage apparatus is in the stowed state, the depression forms an opening between the first side wall of the stowable storage apparatus and the central column for stowing flat objects.

15. A vehicle as claimed in claim 14 wherein the row of seats comprises a pair of spaced apart front seats with a floor console mounted therebetween and the central walkthrough gap is defined between a front end of the floor console and the central column of the structural component.

16. A vehicle as claimed in claim 15 wherein the floor console includes a latch for holding the stowable storage apparatus in the deployed state.

17. A vehicle as claimed in claim 16 wherein the central column includes a panel defining a second end wall for the stowable storage apparatus.

18. A vehicle as claimed in claim 17 wherein the panel, the first end wall and the two side walls form a four sided enclosure for storing one or more small objects.

* * * * *